(12) United States Patent
Griffin et al.

(10) Patent No.: US 12,314,706 B2
(45) Date of Patent: May 27, 2025

(54) JUST-IN-TIME PACKAGER BUILD SYSTEM

(71) Applicant: Red Hat, Inc., Raleigh, NC (US)

(72) Inventors: Leigh Griffin, Waterford (IE);
Leonardo Rossetti, São Paulo (BR)

(73) Assignee: Red Hat, Inc., Raleigh, NC (US)

( * ) Notice: Subject to any disclaimer, the term of this patent is extended or adjusted under 35 U.S.C. 154(b) by 34 days.

(21) Appl. No.: 17/717,921

(22) Filed: Apr. 11, 2022

(65) Prior Publication Data

US 2023/0325179 A1    Oct. 12, 2023

(51) Int. Cl.
*G06F 8/71* (2018.01)
*G06F 11/34* (2006.01)

(52) U.S. Cl.
CPC ............ *G06F 8/71* (2013.01); *G06F 11/3414* (2013.01); *G06F 11/3428* (2013.01)

(58) Field of Classification Search
None
See application file for complete search history.

(56) References Cited

U.S. PATENT DOCUMENTS

| | | | |
|---|---|---|---|
| 9,250,893 B2 | 2/2016 | Blahaerath et al. | |
| 10,216,512 B1* | 2/2019 | Mathew | G06F 8/41 |
| 10,713,090 B2 | 7/2020 | Aggarwal et al. | |
| 2011/0276939 A1* | 11/2011 | Frankin | G06F 8/71 |
| | | | 717/101 |
| 2018/0081652 A1* | 3/2018 | Ahmed | G06F 8/41 |
| 2018/0246707 A1* | 8/2018 | Ahmed | G06F 16/188 |
| 2018/0332138 A1 | 11/2018 | Liu et al. | |
| 2019/0187982 A1* | 6/2019 | Mathew | G06F 8/71 |
| 2019/0220319 A1* | 7/2019 | Parees | G06F 9/5027 |
| 2019/0370139 A1* | 12/2019 | Vichare | G06F 9/44505 |
| 2019/0391898 A1* | 12/2019 | Vichare | G06F 9/44505 |
| 2020/0117508 A1* | 4/2020 | Subramanian | G06F 40/279 |
| 2020/0210302 A1* | 7/2020 | Vichare | G06F 9/44505 |
| 2021/0034278 A1* | 2/2021 | Kaushik | G06F 3/0634 |
| 2021/0089361 A1* | 3/2021 | Rafey | G06F 9/45558 |
| 2021/0141645 A1 | 5/2021 | Kramer et al. | |

FOREIGN PATENT DOCUMENTS

| | | |
|---|---|---|
| CN | 108268316 A | 7/2018 |
| WO | 2021143590 A1 | 7/2021 |

OTHER PUBLICATIONS

Red Hat, Inc., European Search Report dated Dec. 21, 2022, for EP22183196, 8 pages.
"European Patent Examination Report" regarding Application No. 22 183 196.9, mailed on Aug. 2, 2024. pp. 1-5.

* cited by examiner

*Primary Examiner* — Ryan D. Coyer
(74) *Attorney, Agent, or Firm* — Womble Bond Dickinson (US) LLP

(57) ABSTRACT

A method includes receiving a software build task, identifying one or more previously executed software build tasks in view of one or more properties of the software build task and determining a set of computing resources to be allocated to a build container for performing the software build task in view of the one or more previously executed software build tasks. The method further includes generating the build container to perform the software build task.

20 Claims, 7 Drawing Sheets

JUST-IN-TIME PACKAGER BUILD SYSTEM

TECHNICAL FIELD

Aspects of the present disclosure relate to software package building, and more particularly, to a just-in-time packager build system.

BACKGROUND

Software packaging and build systems may generate software packages from source code of an application. The packaging and build systems may generate a package of files usable to execute the application. For example, such systems may identify and retrieve files or packages on which the source code defines dependencies. Packaging and build systems then compile and aggregate the source code and dependencies into a package of files that can be used to run the application.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
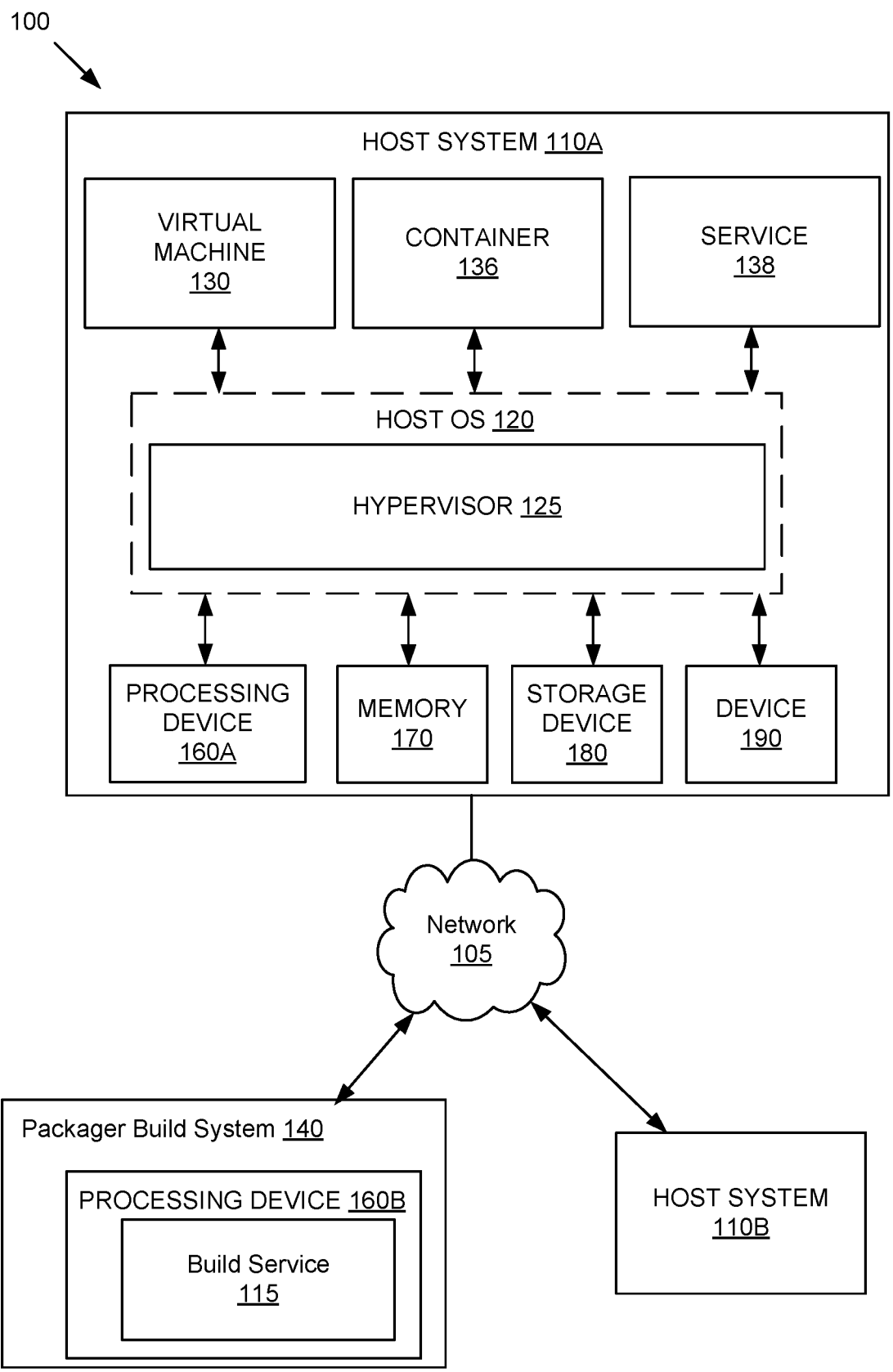
FIG. 1 is a block diagram that illustrates an example computer architecture, in accordance with some embodiments.

A packaging build system may be a service that builds packages of files for an application from source code of the application. For example, the application may include several files and many different kinds of files with interdependencies and hierarchies. A packaging build system may retrieve each source code file (e.g., binary), compile the binary into an executable format, and package the resulting files with each of the necessary dependencies of the package. Convention build systems, however, are limited to usage on bare metal servers due to architectural needs of the build system. Virtualization platforms, such as Kubernetes™ and OpenShift™ have provided for the deployment of builders in a cloud environment. The builders deployed on such environments, however, are inherently wasteful once installed. For example, a builder deployed in a virtualized environment may sit idle for long periods of time when there are no build tasks to perform. The builders may be containers or virtual machines with resources allocated for executing build tasks when they are received by the build system. Thus, any resources allocated to the builder may go unused when they could be allocated for performing other tasks.

Aspects of the present disclosure address the above-noted and other deficiencies by providing a just-in-time packaging build system that allocates resources and generates a builder for each build task as it is received. A build service may dynamically check whether a build task has been received by the build system (e.g., from a user via an application programming interface (API)) that are to be executed. The build service may identify a type of the received task as well as a weight of the task. In some examples, the weight may be determined based on the types and the amount of computing resources that the task is expected to utilize during execution. The build service may then compare the type of the task and the weight of the task to previously executed tasks and their resource utilization and performance profiles. The resource utilization profiles may be obtained by monitoring performance metrics, such as resource utilization (e.g., processing resources, memory, network resources, etc.) during execution, elapsed time for completion of the task, the profile of the allocated resources for the task, etc. The build service may identify one or more of the previously executed tasks having a profile that is the same or similar to the received task. The build service may then generate a builder and allocate an optimal amount of computing resource to the builder for performing the received task.

In some examples, the build service may identify previously executed tasks with similar types and weights as the received task. Furthermore, the build service may determine an optimal amount of computing resources to allocate to tasks with such a type and weight based on the profiles of the previously executed tasks. For example, the profiles of the previously executed tasks may indicate utilization of each type of computing resource and performance (e.g., time taken to execute the task). The build service may identify the profiles of tasks that were executed with good performance while utilizing a large percentage of the allocated resources (e.g., small amount of wasted resources). Thus, the build service may identify profiles of tasks for which an optimal amount of resources had been allocated to a builder for execution of the task such that no additional resources were required and a large amount of the allocated resources were utilized.

In some examples, the build service may provision a new builder in a pod, container, virtual machine, or other virtualized execution environment. The build service may allocate a particular amount of computing resources to the new builder based on the historical usage profiles, as described above. The build service may further monitor performance and usage metrics of the new builder as the task is executed. Upon completion of the task, the build service may destroy the builder and store the monitored performance and usage metrics in a historical usage profile archive for further use and optimization of builder generation for future tasks.

By allocating an amount of computing resources for a builder for a build task based on historical usage profiles of previously executed build tasks, computing resources can be allocated more efficiently with reduced waste of computing resources. Accordingly, the allocation of resources to builders can be optimally defined and allocated at the time that a build task is received, preventing wasted resources due to idle builders.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and packager build system 140. The host systems 110A-B and packager build system 140 include one or more processing devices 160A-B, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A-B. It should be noted that although, for simplicity, host system 110A is depicted as including a single processing device 160A, storage device 180, and device 190 in FIG. 1, other embodiments of host systems 110A may include a plurality of processing devices, storage devices, and devices. Similarly, packager build system 140 and host system 110B may include a plurality of processing devices, storage devices, and devices. The host systems 110A-B and RBAC system 140 may each be a server, a mainframe, a workstation, a personal computer (PC), a mobile phone, a palm-sized computing device, etc. In embodiments, host systems 110A-B and packager build system 140 may be separate computing devices. In some embodiments, host systems 110A-B and/or packager build system 140 may be implemented by a single computing device. For clarity, some components of packager build system 140 and host system 110B are not shown. Furthermore, although computer system architecture 100 is illustrated as having two host systems, embodiments of the disclosure may utilize any number of host systems.

Host system 110A may additionally include one or more virtual machines (VMs) 130, containers 136, and host operating system (OS) 120. VM 130 is a software implementation of a machine that executes programs as though it were an actual physical machine. Container 136 acts as an isolated execution environment for different functions of applications. The VM 130 and/or container 136 may be an instance of a serverless application or function for executing one or more applications of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110A-B and packager build system 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or packager build system 140. In some embodiments, host system 110A and 110B may be a part of packager build system 140. For example, the virtual machines 130 and/or containers 136 of host system 110A and 110B may be deployed as package builders by the packager build system 140.

In embodiments, processing device 160B of the packager build system 140 may execute a build service 115. The build service 115 may receive or identify a software build task and create a builder to perform the software build task. In some examples, the build service 115 may identify previously executed tasks with similar characteristics as the received build task. For example, the build service 115 may identify a type of the build task (e.g., type of software to be build and packaged) and a weight of the build task. The weight of the build task may indicate expected computing resource requirements of the build task. The build service 115 may thus identify previously executed tasks with a similar type and weight of the build task. For example, the packager build system 140 may monitor and store a performance and usage profile for build tasks. The profile may include performance metrics, allocated resources, and any other metrics associated with execution of each task. Accordingly, the build service 115 may determine, based on the profiles of the previously executed tasks, an optimal amount of resources to allocate to a builder (e.g., build container, VM, or the like). Further details regarding the build service 115 will be discussed at FIGS. 2-6 below.

Figure 2:
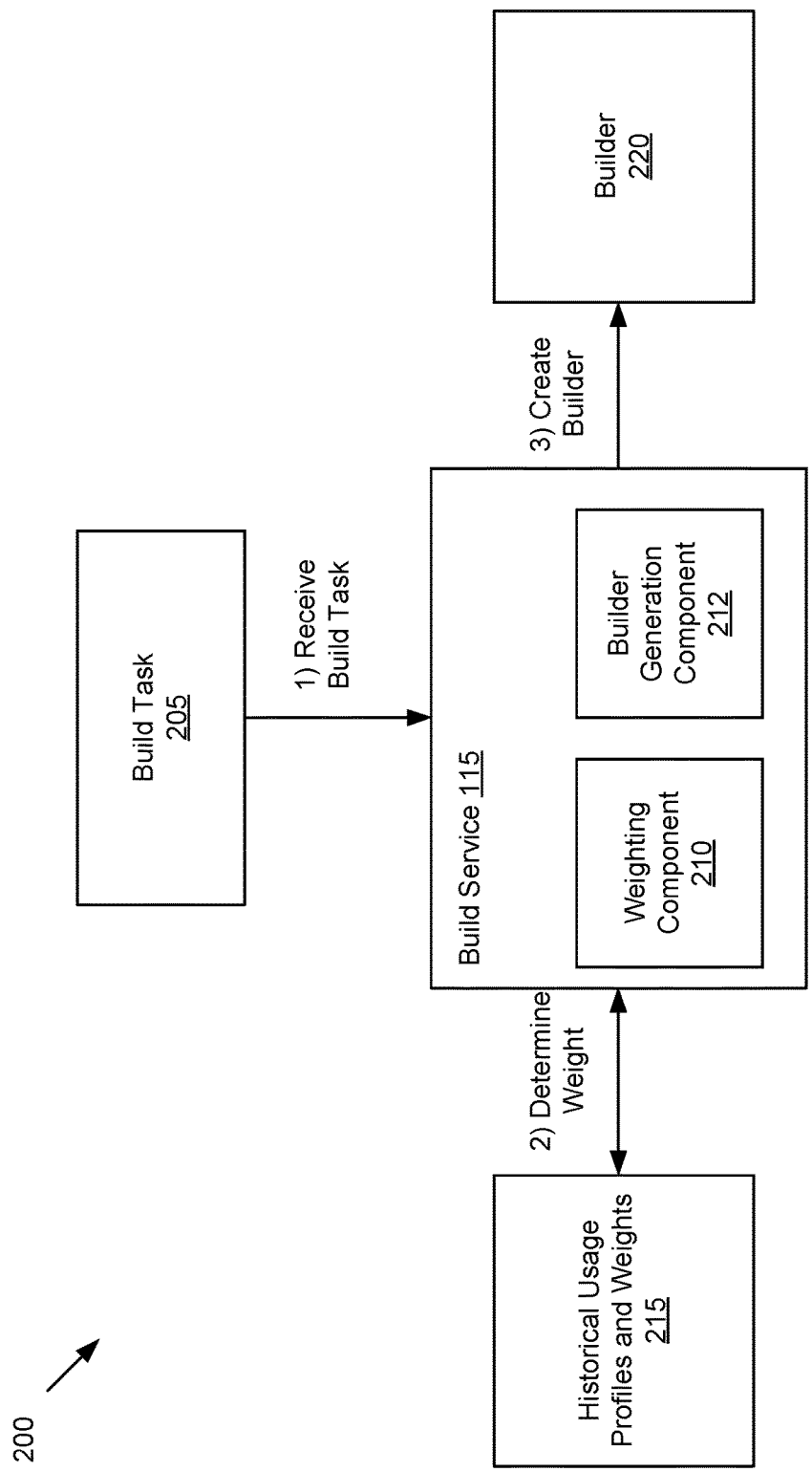
FIG. 2 is an illustration of an example of a computer system for just-in-time builder creation, in accordance with embodiments of the disclosure.

FIG. 2 depicts an example of a system 200 for creating a package builder for performing a build task, in accordance with embodiments of the disclosure. The system 200 includes a build service 115 for creating a package builder in response to receiving a software build task. In some examples, the build service 115 receives a build task 205 (e.g., from a user via an API of the system 200). The build task 205 may be a request for building a package from application source code indicated by the build task 205. In some examples, the build task 205 may include an indication of the type of software to be built (e.g., operating system image, software packages, etc.), a location of the source code of the software to be built, a size of the source code, etc.

In some examples, the build service 115 may include a weighting component 210 and a builder generation component 212. Upon receiving the build task 205, the weighting component 210 may assign a weight to the build task 205. The weight assigned to the build task 205 may be determined based on the resources expected to be used to execute the build task 205. In some examples, the weight may be encoded within a description of the build task 205. The weighting component 210 may further compare the type of the build task 205 and the weight assigned to the build task 205 to historical usage profiles and weights 215 of previously executed build tasks. The weighting component 210 may determine an optimal weighting (e.g., resource allocation) for the build task 205 based on the historical usage profiles and weights 215 similar to the build task 205. For examples, the historical usage profiles and weights 215 may include performance metrics, resource allocation profiles, and resource usage profiles for the previously executed tasks. Thus, the weighting component 210 may identify similar tasks with profiles indicating good performance during execution and within a threshold or range of utilization of the allocated resources. The weighting component 210 may then apply an updated weight to the build task 205 informed by the similar previously executed tasks.

The builder generation component 212 may create a builder 220 based on the weight assigned to the build task 205 by the weighting component 210. In one example, the builder generation component 212 may determine an amount of resources to allocate to the builder 220 based on the weight assigned to the build task 205 and then instantiate the builder 220 to execute the build task 205. In another example, the builder generation component 212 may select the builder 220 from a plurality of builder images with predefined resource allocation profiles. The builder generation component 212 may then instantiate and instance of the selected builder image to execute the build task 205. As described with respect to FIG. 3 below, the builder 220 may be monitored during execution to generate and store a usage profile associated with execution of the build task 205.

Figure 3:
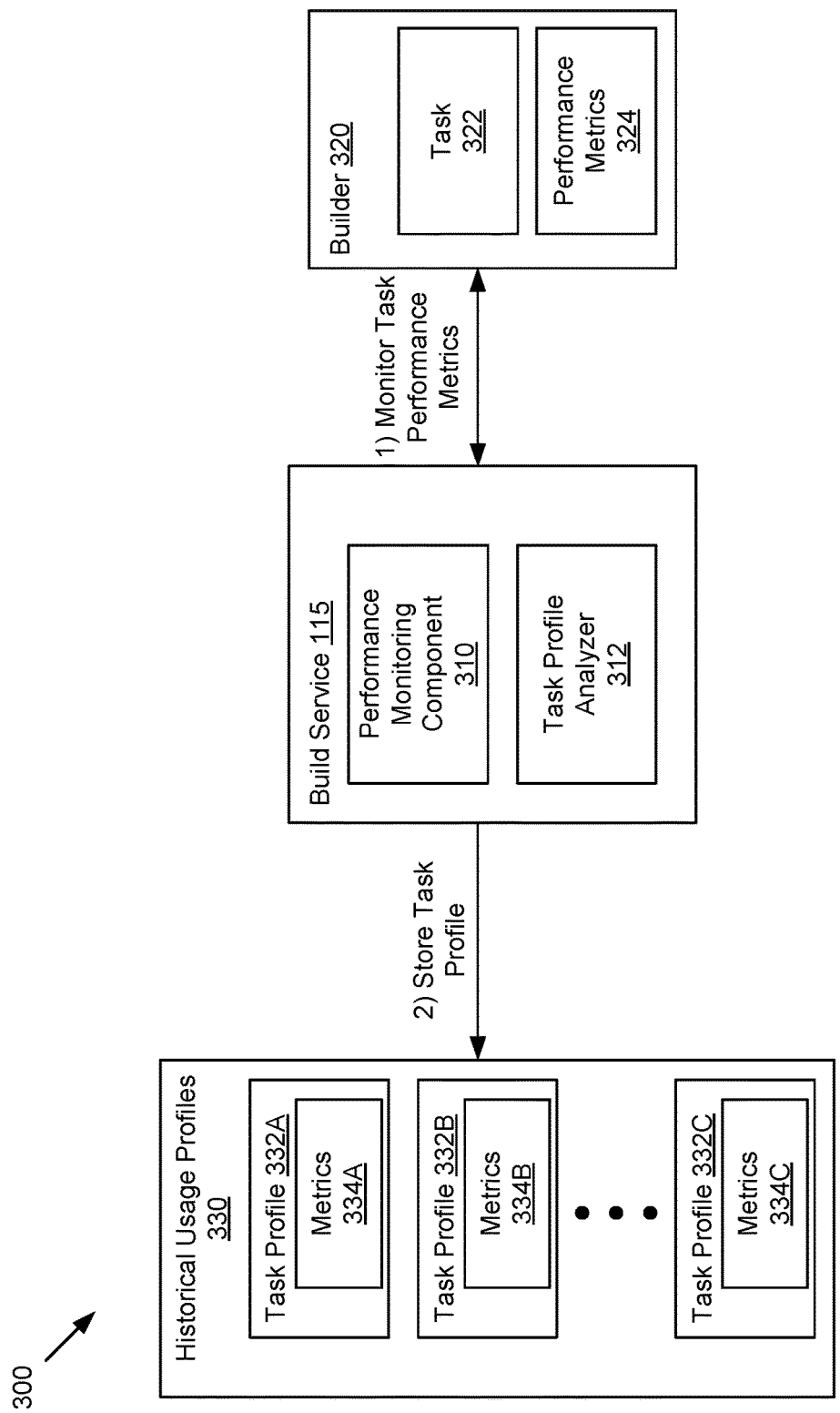
FIG. 3 depicts another example system of a computer system for collection of performance metrics in a just-in-time build system, in accordance with some embodiments.

FIG. 3 is an example of a system 300 for profiling build tasks for use in opinionated builder creation, in accordance with embodiments of the disclosure. The system 300 may include build service 115, which may be the same or similar to build service 115 described with respect to FIG. 1 and FIG. 2. The build service 115 may include a performance monitoring component and a task profile analyzer 312. In some examples, the build service 115 may create a builder 320 to execute a build task 322, as described above with respect to FIG. 2. After creation of the builder 320, the performance monitoring component 310 may monitor performance metrics 324 of the builder 320 during execution of the build task 322. For example, the builder 320 may be a container, VM, or other virtualized execution environment with resources allocated for executing the build task 322. Accordingly, a certain amount of computing resources (e.g., processing resources, networking resources, memory, etc.) may be allocated to the builder 320 for execution of the build task 322. The performance metrics 324 may include the amount of allocated computing resources, a utilization of the allocated resources (e.g., as a percentage of the allocated resources), an amount of time the task 322 takes to complete, and any other performance related metrics associated with build task execution.

In some examples, the task profile analyzer 312 may perform an analysis of the task 322 and the performance metrics 324 obtained during execution of the task 322 to determine a usage profile of the task 322 and an associated weight of the task 322. In some examples, the task profile analyzer 312 may also perform additional analysis of the performance metrics 324 of the task to classify and/or group the task 322. For example, the build service 115 may store a determined task profile (e.g., task profiles 332A-C) of the task 322 with historical usage profiles 330 of previously executed build tasks. Each task profile 332A-C may include the performance metrics 334A-C monitored during execution of the task. Accordingly, the task profile analyzer 312 may identify task profiles 332A-C that are similar. Additionally, the task profile analyzer 312 may determine which task profiles of the stored task profiles 332A-C indicate that performance of the task was maximized or exceeded a performance threshold. For example, the task profile analyzer 312 may determine that the performance metrics of a task profile indicate that the time elapsed during execution of the task was minimized (e.g., relative to other similar tasks) and that a threshold percentage of the computing resources allocated to the builder were used to execute the task (e.g., so that computing resources are not wasted from over-allocation). Therefore, as described above with respect to FIG. 2, the build service 115 may use create a builder to execute a build task with resources allocated based on the task profiles 332A-C of the previously executed build tasks.

Figure 4:
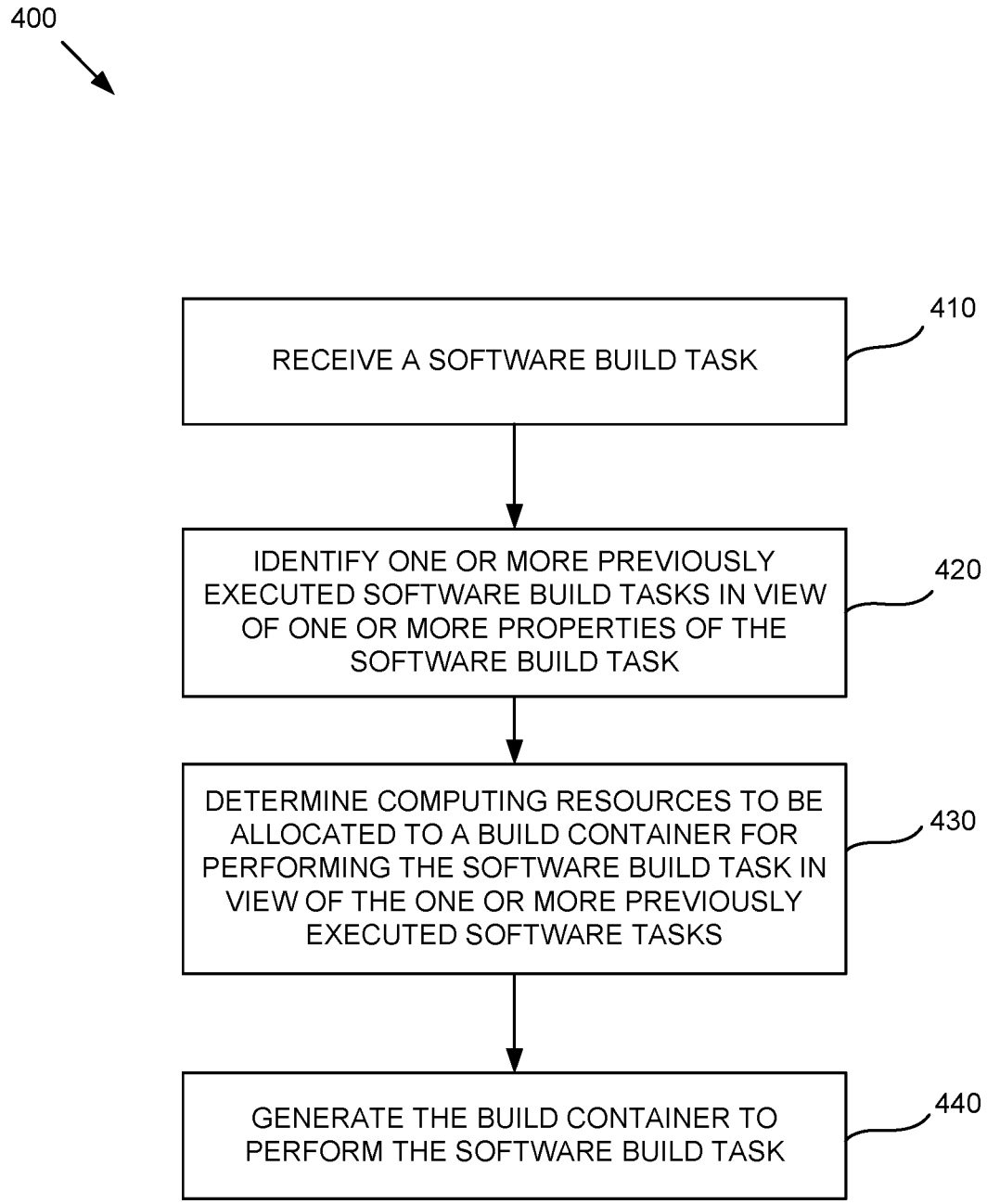
FIG. 4 flow diagram of a method of packaging builder creation, in accordance with some embodiments.

FIG. 4 is a flow diagram of a method 400 of generating a build container for a software build task, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by build service 115 of packager build system 140 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives a software build task. The software build task may be a request to build a software package from source code of an application. In some examples, the software build task may identify a type of the task, a description of the task, or the like. In some examples, the software build task may include the location of the source code that is to be packaged. Upon receiving the software build task, the processing logic may assign a weight to the software build task. The weight may be a number (e.g., an integer or decimal number) determined based on information associated with the build task, such as the type of build (e.g., type of software or application being built), a size of the build (e.g., the size of the files to be compiled and packaged), and any additional task description. In some examples, the weight may be correspond to an expected amount of computing resources for executing the task.

At block 420, the processing logic identifies one or more previously executed software build tasks in view of one or more properties of the software build task. The one or more properties may include a type (e.g., a type of software or application to be built) of the software build task and the weight assigned to the build task. In some examples, the processing logic may compare the type of the software build task and the weight assigned to the software task with historical usage profiles to identify the one or more previously executed software build tasks. In some examples, the weight may then be updated and refined based on a comparison of the software build task with the one or more previously executed software tasks.

In some examples, the processing logic identifies the previously executed tasks based on a minimum performance of the task. For example, the processing logic may identify similar tasks (e.g., tasks with similar type, size, etc.) which were performed within an expected amount of time without over-allocation of computing resources. In some examples, the processing logic may also may determine whether the previously executed tasks included an over-allocation of resources or did not include sufficient resources. The processing logic may then adjust the weight assigned to the task for proper allocation of resources. For example, if a computing resource for a builder was either over-allocated or under-allocated, the processing logic may adjust the corresponding weight accordingly (e.g., for more appropriate allocation to the new task).

At block 430, the processing logic determines computing resources to be allocated to a build container for performing the software build task in view of the one or more previously executed software tasks. For example, the processing logic may allocate the computing resources to the build container based on the weight assigned to the software build task. In some examples, the processing logic may determine the allocation of computing resources based on the allocation and usage profiles of the previously executed software tasks (e.g., based on the updated weight of the task.) At block 440, the processing logic generates the build container to perform the software build task.

Figure 5:
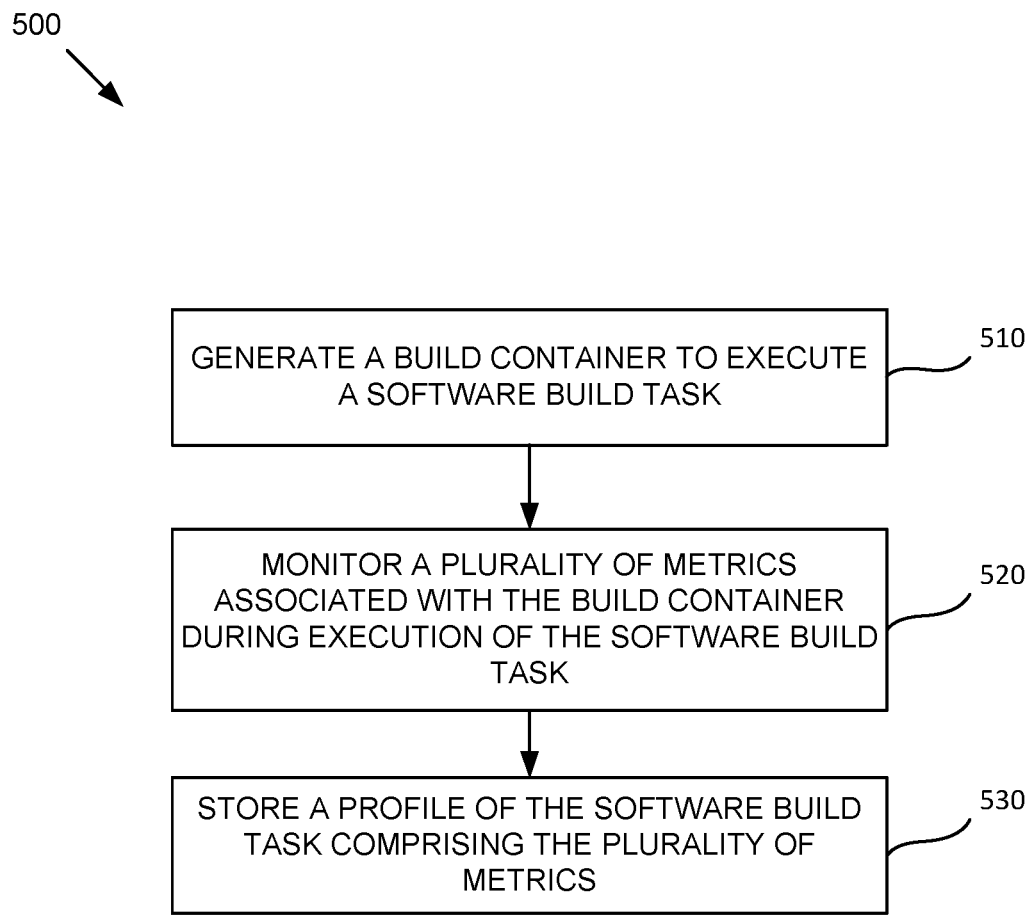
FIG. 5 is a flow diagram of a method of build task monitoring in a build system, in accordance with some embodiments.

FIG. 5 is a flow diagram of a method 500 of monitoring performance of a software build task within a build container, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed build service 115 of packager build system 140 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic generates a build container to execute a software build task. The processing logic may generate the build container in a similar manner as described above with respect to FIG. 4. The processing logic may allocate a set of computing resources (e.g., processing, memory, networking, etc.) for performing the software build task. For example, the set of computing resources may be allocated based on a weight assigned to the software build task. The weight may be determined based on a type of the software build task, a size of the task, and any additional task description.

At block 520, the processing logic monitors a plurality of metrics associated with the build container during execution of the software build task. For example, the processing logic may collect computing resource utilization statistics of the build container during performance of the build task. The processing logic may, for example, determine a utilization rate (e.g., utilization percentage) of each allocated resource. In some examples, the processing logic may determine an amount of time taken to execute the build task in comparison to an expected amount of time to perform the task. The processing logic may also determine whether less than a sufficient amount of one or more computing resources were allocated to the build container. For example, the processing logic may determine if the amount of memory allocated to the build container was sufficient to execute the task.

At block 530, the processing logic stores a profile of the software build task comprising the plurality of metrics. For example, the processing logic may store the profile to a data store including historical usage data and historical usage profiles of previously executed build tasks. The stored profiles may then be used to more accurately estimate the resources required for a new task. For example, the processing logic may update the weight assigned to a new task based on an analysis of the previously executed tasks stored at the data store.

Figure 6:
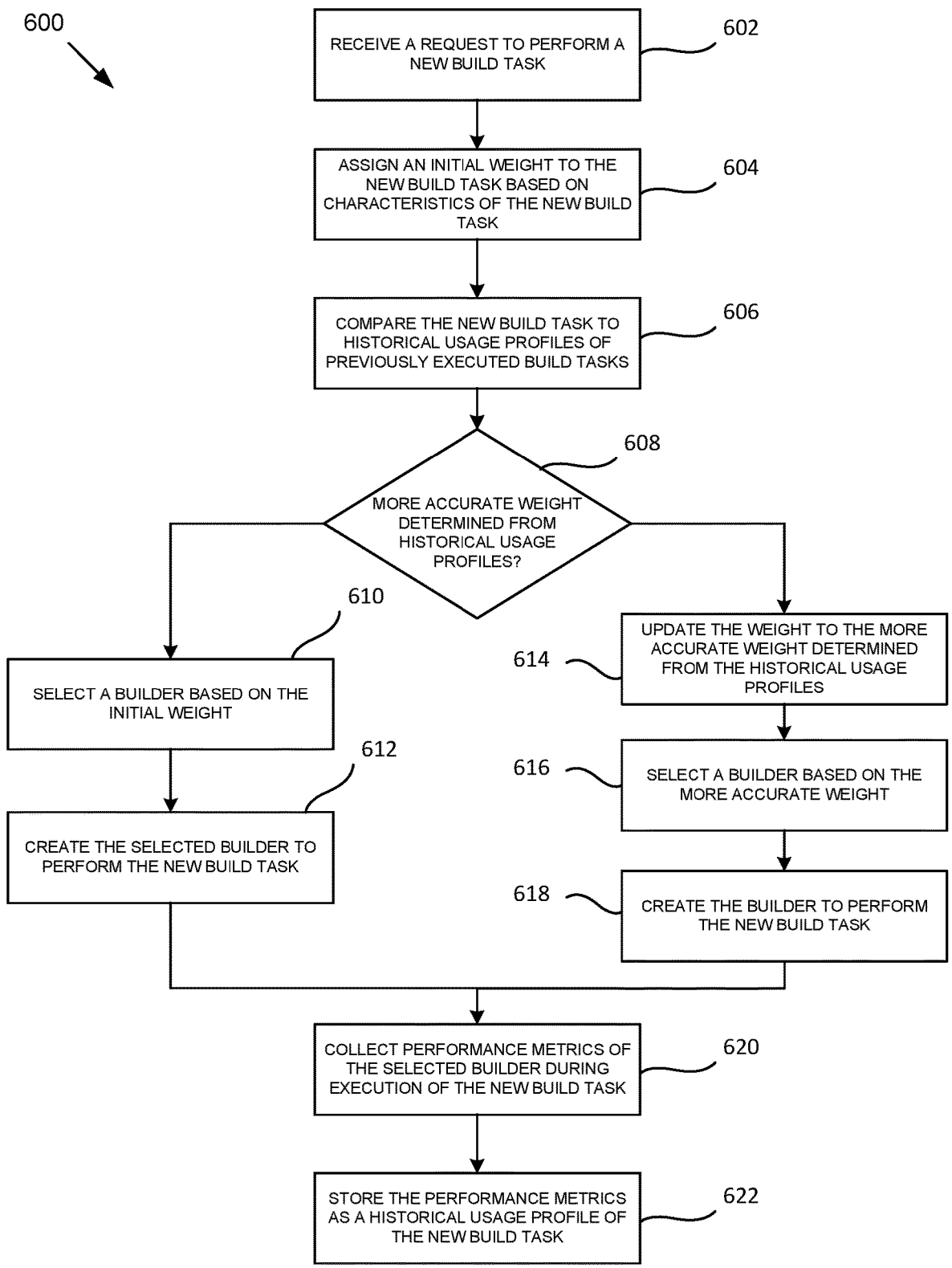
FIG. 6 is a flow diagram of a method of performing just-in-time creation of a builder using previous task profiles, in accordance with some embodiments.

FIG. 6 is a flow diagram of a method 600 of performing just-in-time creation of a software builder for a build task, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by build service 115 of build system 140 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 602, where the processing logic receives a request to perform a new build task. The new build task may indicate source code of an application that is to be retrieved, compiled, and packaged into an executable format.

At block 604, the processing logic assigns an initial weight to the new build task based on characteristics of the new build task. The characteristics of the new build task may include a type of the new build task (e.g., a type of the software to be built and packaged), a size of the source code files, and any other information describing the source code or the new build task. The initial weight may be calculated based on the characteristics of the new build task. In some examples, the weight may be a numerical score associated with the new build task indicating an amount of computing resources the new build task may utilize during execution.

At block 606, the processing logic compares the new build task to historical usage profiles of previously executed build tasks. For example, the processing logic may compare the characteristics of the new build task to previously executed build tasks. At block 608, the processing logic determines whether a more accurate weight for the new build task was determined from the historical usage profiles. For example, if the processing logic identifies previously executed build tasks then the processing logic may use the resource usage profiles associated with the similar tasks to more accurately predict an amount of resources that the new build task will utilize. For example, the previously executed build tasks may include one or more tasks that executed in an efficient manner with properly allocated resources (e.g., resources were not wasted and more were not required). The processing logic may accordingly determine to use a weight similar to those one or more tasks. Alternatively, the processing logic may determine that more or fewer resources should have been allocated to similar tasks and adjust the weight of the new task accordingly.

At block 610, in response to determining that a more accurate weight was not determined, the processing logic selects a builder based on the initial weight assigned to the new build task. In some examples, the processing logic may select the builder from multiple builders with different amounts of allocated resources may be selected. In some examples, the processing logic may allocate a set of computing resources to a builder based on the initial weight (e.g., higher weight results is more computing resources). At block 612, the processing logic creates the selected builder to perform the new build task. In some examples, the builder may be a container including scripts or services to perform the new build task. In some examples, the builder may be a virtual machine or other virtualized execution environment in which the new build task is to be executed.

At block 614, in response to determining that a more accurate weight for the new build task was determined, the processing logic updates the weight of the new build task to the more accurate weight determined from the historical usage profiles. At block 616, the processing logic selects a builder based on the more accurate weight. At block 618, the processing logic creates the new builder to perform the new build task.

At block 620, the processing logic collects performance metrics of the selected builder during execution of the new build task. For example, the processing logic may collect metrics such as processing resource usage, network resource usage, input/output bandwidth usage, or memory resource usage. The processing logic may also determine an amount of time elapsed during execution of the new build task.

At block 622, the processing logic stores the performance metrics as a historical usage profile of the new build task. The historical usage profile may include all the collected performance metrics as well as the characteristics of the new build task, such as type, size, etc. Thus, the historical usage profile can be used to more efficiently allocate computing resources of future build tasks.

Figure 7:
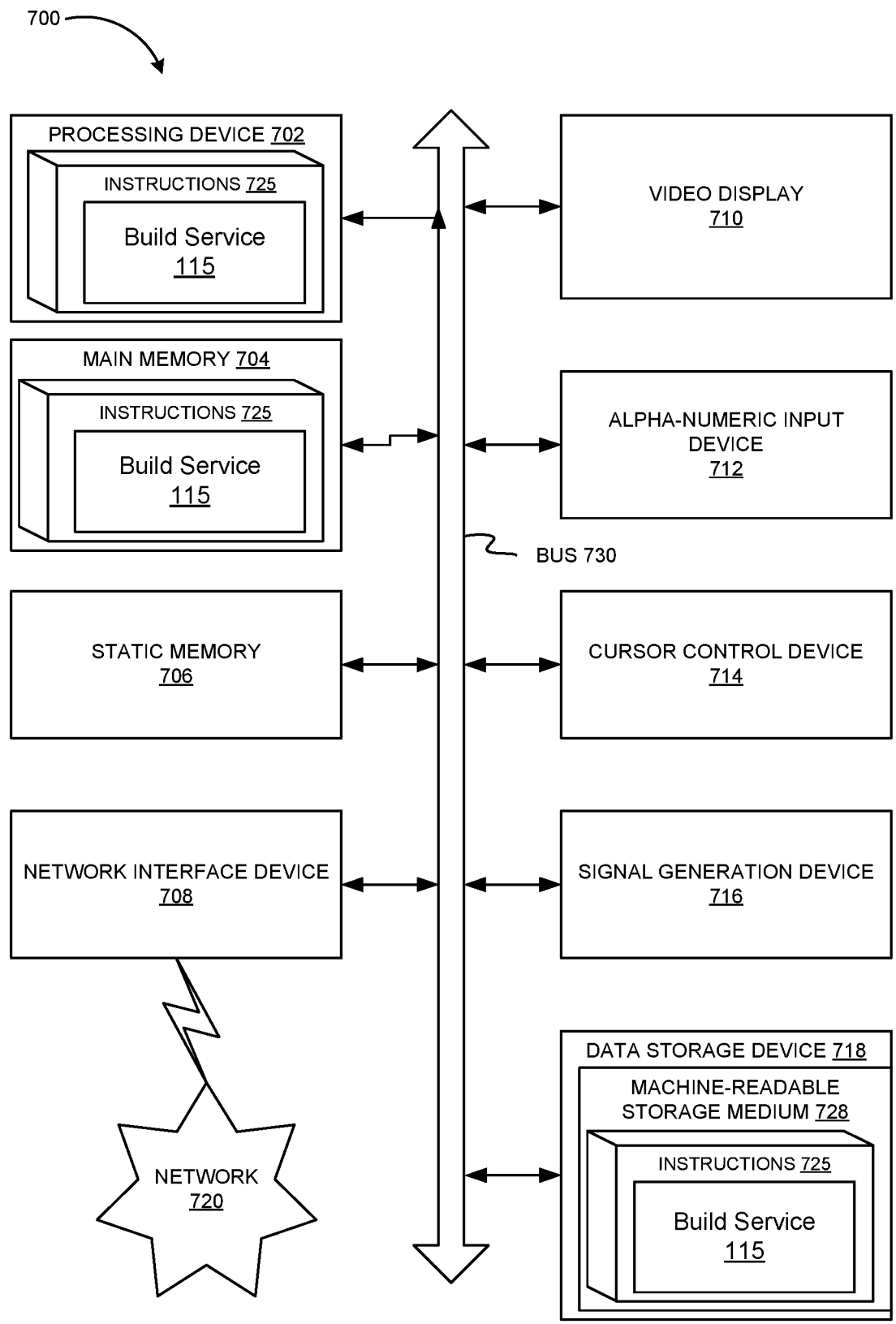
FIG. 7 is a block diagram of an example apparatus that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for a build service, e.g., build service 115 for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method including receiving a software build task, identifying one or more previously executed software build tasks in view of one or more properties of the software build task, determining a set of computing resources to be allocated to a build container for performing the software build task in view of the one or more previously executed software build tasks, and generating the build container to perform the software build task.

Example 2 is the method of Example 1, wherein the build container includes one or more scripts for retrieving and packaging source code of an application.

Example 3 is the method of any of Examples 1 or 2, wherein the one or more properties of the software build task include one or more of a type of the software build task and a weight associated with the software build task.

Example 4 is the method of any of Examples 1-3, wherein identifying one or more previously executed software build tasks in view of the one or more properties of the software build task includes comparing the type and the weight of the software build task with the one or more previously executed software build tasks.

Example 5 is the method of any of Examples 1~4 further includes monitoring a set of performance metrics of the build container during execution of the software build task and storing a profile of the software build task including the set of performance metrics.

Example 6 is the method of any of Examples 1-5 wherein determining the set of computing resources to be allocated to the build container for performing the software build task includes identifying resource usage profiles of the one or more previously executed software build tasks and determining the set of computing resources in view of the resource usage profiles of the one or more previously executed software build tasks.

Example 7 is the method of any of Examples 1-6 wherein the resource usage profiles comprise at least one of processing resource usage, network resource usage, input/output bandwidth usage, or memory resource usage associated with executing each of the previously executed software build tasks.

Example 8 a system including a memory and a processing device, operatively coupled to the memory, to receive a software build task, identify one or more previously executed software build tasks in view of one or more properties of the software build task, determine a set of computing resources to be allocated to a build container for performing the software build task in view of the one or more previously executed software build tasks, and generate the build container to perform the software build task.

Example 9 is the system of any one of Example 8, wherein the build container includes one or more scripts to retrieve and package source code of an application.

Example 10 is the system of any one of Examples 8 or 9 wherein the one or more properties of the software build task include a type of the software build task and a weight associated with the software build task.

Example 11 is the system of any one of Examples 8-10 wherein to identify the one or more previously executed software build tasks in view of the one or more properties of the software build task, the processing device is to compare the type and the weight of the software build task with the one or more previously executed software build tasks.

Example 12 is the system of any one of Examples 8-11 wherein the processing device is further to monitor a set of performance metrics of the build container during execution of the software build task and store a profile of the software build task including the set of performance metrics.

Example 13 is the system of any one of Examples 8-12 wherein to determine the set of computing resources to be allocated to the build container for performing the software build task, the processing device is to identify resource usage profiles of the one or more previously executed software build tasks and determine the set of computing resources in view of the resource usage profiles of the one or more previously executed software build tasks.

Example 14 is the system of any one of Examples 8-13 wherein the resource usage profiles comprise at least one of processing resource usage, network resource usage, input/output bandwidth usage, or memory resource usage associated with executing each of the previously executed software build tasks.

Example 15 is a non-transitory computer-readable storage medium including instructions that, when executed by a processing device, cause the processing device to receive a software build task, identify one or more previously executed software build tasks in view of one or more properties of the software build task, determine a set of computing resources to be allocated to a build container for performing the software build task in view of the one or more previously executed software build tasks, and generate the build container to perform the software build task.

Example 16 is the non-transitory computer-readable storage medium of Example 15, wherein the build container includes one or more scripts to retrieve and package source code of an application.

Example 17 is the non-transitory computer-readable storage medium of Examples 15 or 16, wherein the one or more properties of the software build task include a type of the software build task and a weight associated with the software build task.

Example 18 is the non-transitory computer-readable storage medium of any one of Examples 15-17, wherein to identify the one or more previously executed software build tasks in view of the one or more properties of the software build task, the processing device is to compare the type and the weight of the software build task with the one or more previously executed software build tasks.

Example 19 is the non-transitory computer-readable storage medium of any one of Examples 15-18, wherein the processing device is further to monitor a set of performance metrics of the build container during execution of the software build task and store a profile of the software build task including the set of performance metrics.

Example 20 is the non-transitory computer-readable storage medium of any one of Examples 15-19, wherein to determine the set of computing resources to be allocated to the build container for performing the software build task, the processing device is to identify resource usage profiles of the one or more previously executed software build tasks and determine the set of computing resources in view of the resource usage profiles of the one or more previously executed software build tasks.

Example 21 is the non-transitory computer-readable storage medium of any one of Examples 15-20 wherein the resource usage profiles comprise at least one of processing resource usage, network resource usage, input/output bandwidth usage, or memory resource usage associated with executing each of the previously executed software build tasks.

Example 22 is a method including determining that a new software build task has been received, determining an amount of computing resources to be allocated for executing the build task, and creating a builder comprising the amount of computing resources, the builder to execute the build task.

Example 23 is the method of Examples 22, wherein the builder is a container comprising one or more scripts for retrieving and packaging source code.

Example 24 is the method of any one of Examples 22 or 23, wherein determining the amount of resources includes identifying one or more previously executed tasks with characteristics similar to the new task and determining the resources based on one or more metrics associated with the previously executed tasks.

Example 25 is the method of any one of Examples 22-24, wherein creating the builder includes allocating the amount of computing resources to the container and instantiating a container comprising the amount of computing resources.

Example 26 is the method of any one of Examples 22-25, further including destroying the builder upon completion of the new software build task.

Example 27 is the method of any one of Examples 22-26 wherein creating the builder includes selecting the builder from a set of builders, the builder including the corresponding amount of resources for executing the build task and creating an instance of the builder.

Example 28 is a system including a memory and a processing device, operatively coupled to the memory, to generate a build container to execute a software build task, monitor a set of metrics associated with the build container during execution of the software build task, and store a profile of the software build task comprising the set of metrics.

Example 29 is the system of Example 28, wherein the processing device is further to receive a second software build task and determine a resource allocation for a second build container to execute the second software build task in view of the profile of the first software build task.

Example 30 is the system of Example 28 or 29, wherein the processing device is further to monitor the set of metrics for the second build container during execution of the second software build task and store a profile of the second software build task including the set of metrics.

Example 31 is the system of any one of Examples 28-30, wherein the profile of the software build task further comprises a type of the software build task, a type of package to be built by the software build task, or a programming language associated with the software build task.

Example 32 is the system of any one of Examples 28-31, wherein determining the resource allocation comprises determining that a type of the second software build task corresponds to a type of the first software build task indicated by the profile of the first software build task.

Example 33 is an apparatus including means for receiving a software build task, identifying one or more previously executed software build tasks in view of one or more properties of the software build task, determining a set of computing resources to be allocated to a build container for performing the software build task in view of the one or more previously executed software build tasks, and generating the build container to perform the software build task.

Example 34 is the apparatus of Example 33, wherein the build container includes means for retrieving and packaging source code of an application.

Example 35 is the apparatus of Example 33 or 34, wherein the one or more properties of the software build task include one or more of a type of the software build task and a weight associated with the software build task.

Example 36 is the apparatus of any one of Examples 33-35, wherein the means for identifying one or more previously executed software build tasks in view of the one or more properties of the software build task include means for comparing the type and the weight of the software build task with the one or more previously executed software build tasks.

Example 37 is the apparatus of any one of Examples 33-36 further including means for monitoring a set of performance metrics of the build container during execution of the software build task and storing a profile of the software build task including the set of performance metrics.

Example 38 is the apparatus of any one of Examples 33-37 wherein the resource usage profiles include at least one of processing resource usage, network resource usage, input/output bandwidth usage, or memory resource usage associated with executing each of the previously executed software build tasks.

Example 39 is the apparatus of any one of Examples 33-38 wherein the resource usage profiles comprise at least one of processing resource usage, network resource usage, input/output bandwidth usage, or memory resource usage associated with executing each of the previously executed software build tasks.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving a software build task;
determining an initial weighting of the software build task in view of a type of the software build task, the initial weighting corresponding to a first amount of resources to be assigned to the software build task;
identifying, by a processing device, one or more previously executed software build tasks that are similar to the software build task, the one or more previously executed software build tasks comprising one or more properties matching the software build task;
determining an updated weighting of the software build task based on a comparison of the type of the software build task and a weight assigned to the one or more previously executed software build tasks with historical usage profiles, wherein the determining the updated weighting includes a determination whether the updated weighting for the software build task is based on resource usage profiles for similar tasks;
determining, by the processing device, a second amount of computing resources to be allocated to a build container for performing the software build task in view of the updated weighting of the software build task; and
generating, by the processing device, the build container to perform the software build task, the build container comprising the second amount of computing resources determined to be allocated to the build container in view of the updated weighting of the software build task.

2. The method of claim 1, wherein the build container comprises one or more scripts for retrieving and packaging source code of an application.

3. The method of claim 1, wherein the one or more properties of the software build task comprise one or more of a type of the software build task and a weight associated with the software build task.

4. The method of claim 3, wherein identifying one or more previously executed software build tasks in view of the one or more properties of the software build task comprises:
comparing the type and the weight of the software build task with the one or more previously executed software build tasks.

5. The method of claim 1, further comprising:
monitoring a plurality of performance metrics of the build container during execution of the software build task; and
storing a profile of the software build task comprising the plurality of performance metrics.

6. The method of claim 1, wherein determining the second amount of computing resources to be allocated to the build container for performing the software build task comprises:
identifying resource usage profiles of the one or more previously executed software build tasks; and
determining a set of computing resources in view of the resource usage profiles of the one or more previously executed software build tasks.

7. The method of claim 6, wherein the resource usage profiles comprise at least one of processing resource usage, network resource usage, input/output bandwidth usage, or memory resource usage associated with executing each of the previously executed software build tasks.

8. A system comprising:
a memory; and
a processing device, operatively coupled to the memory, to:

receive a software build task;
determine an initial weighting of the software build task in view of a type of the software build task, the initial weighting corresponding to a first amount of resources to be assigned to the software build task;
identify one or more previously executed software build tasks that are similar to the software build task, the one or more previously executed software build tasks comprising of one or more properties matching the software build task;
determine an updated weighting of the software build task based on a comparison of the type of the software build task and a weight assigned to the one or more previously executed software build tasks with historical usage profiles, wherein to determine the updated weighting the processing device is to determine whether the updated weighting for the software build task is based on resource usage profiles for similar tasks;
determine a second amount of computing resources to be allocated to a build container for performing the software build task in view of the updated weighting of the software build task; and
generate the build container to perform the software build task, the build container comprising the second amount of computing resources determined to be allocated to the build container in view of the updated weighting of the software build task.

9. The system of claim 8, wherein the build container comprises one or more scripts to retrieve and package source code of an application.

10. The system of claim 8, wherein the one or more properties of the software build task comprise a type of the software build task and a weight associated with the software build task.

11. The system of claim 10, wherein to identify the one or more previously executed software build tasks in view of the one or more properties of the software build task, the processing device is to:
compare the type and the weight of the software build task with the one or more previously executed software build tasks.

12. The system of claim 8, wherein the processing device is further to:
monitor a plurality of performance metrics of the build container during execution of the software build task; and
store a profile of the software build task comprising the plurality of performance metrics.

13. The system of claim 8, wherein to determine the second amount of computing resources to be allocated to the build container for performing the software build task, the processing device is to:
identify resource usage profiles of the one or more previously executed software build tasks; and
determine a set of computing resources in view of the resource usage profiles of the one or more previously executed software build tasks.

14. The system of claim 13, wherein the resource usage profiles comprise at least one of processing resource usage, network resource usage, input/output bandwidth usage, or memory resource usage associated with executing each of the previously executed software build tasks.

15. A non-transitory computer readable storage medium including instructions stored therein, that when executed by a processing device, cause the processing device to:

receive a software build task;
determine an initial weighting of the software build task in view of a type of the software build task, the initial weighting corresponding to a first amount of resources to be assigned to the software build task;
identify, by the processing device, one or more previously executed software build tasks that are similar to the software build task, the one or more previously executed software build tasks comprising one or more properties matching the software build task;
determine an updated weighting of the software build task based on a comparison of the type of the software build task and a weight assigned to the one or more previously executed software build tasks with historical usage profiles, wherein to determine the updated weighting the processing device is to determine whether the updated weighting for the software build task is based on resource usage profiles for similar tasks;
determine, by the processing device, a second amount of computing resources to be allocated to a build container for performing the software build task in view of the updated weighting of the software build; and
generate, by the processing device, the build container to perform the software build task, the build container comprising the second amount of computing resources determined to be allocated to the build container in view of the updated weighting of the software build task.

16. The non-transitory computer readable storage medium of claim 15, wherein the build container comprises one or more scripts to retrieve and package source code of an application.

17. The non-transitory computer readable storage medium of claim 15, wherein the one or more properties of the software build task comprise a type of the software build task and a weight associated with the software build task.

18. The non-transitory computer readable storage medium of claim 17, wherein to identify the one or more previously executed software build tasks in view of the one or more properties of the software build task, the processing device is to:
compare the type and the weight of the software build task with the one or more previously executed software build tasks.

19. The non-transitory computer readable storage medium of claim 15, wherein the processing device is further to:
monitor a plurality of performance metrics of the build container during execution of the software build task; and
store a profile of the software build task comprising the plurality of performance metrics.

20. The non-transitory computer readable storage medium of claim 15, wherein to determine the second amount of computing resources to be allocated to the build container for performing the software build task, the processing device is to:
identify resource usage profiles of the one or more previously executed software build tasks; and
determine a set of computing resources in view of the resource usage profiles of the one or more previously executed software build tasks.

* * * * *